Oct. 6, 1964       H. W. GROTEWOLD       3,151,734
FRUIT CLAMPING MECHANISM
Original Filed April 23, 1958       4 Sheets-Sheet 1
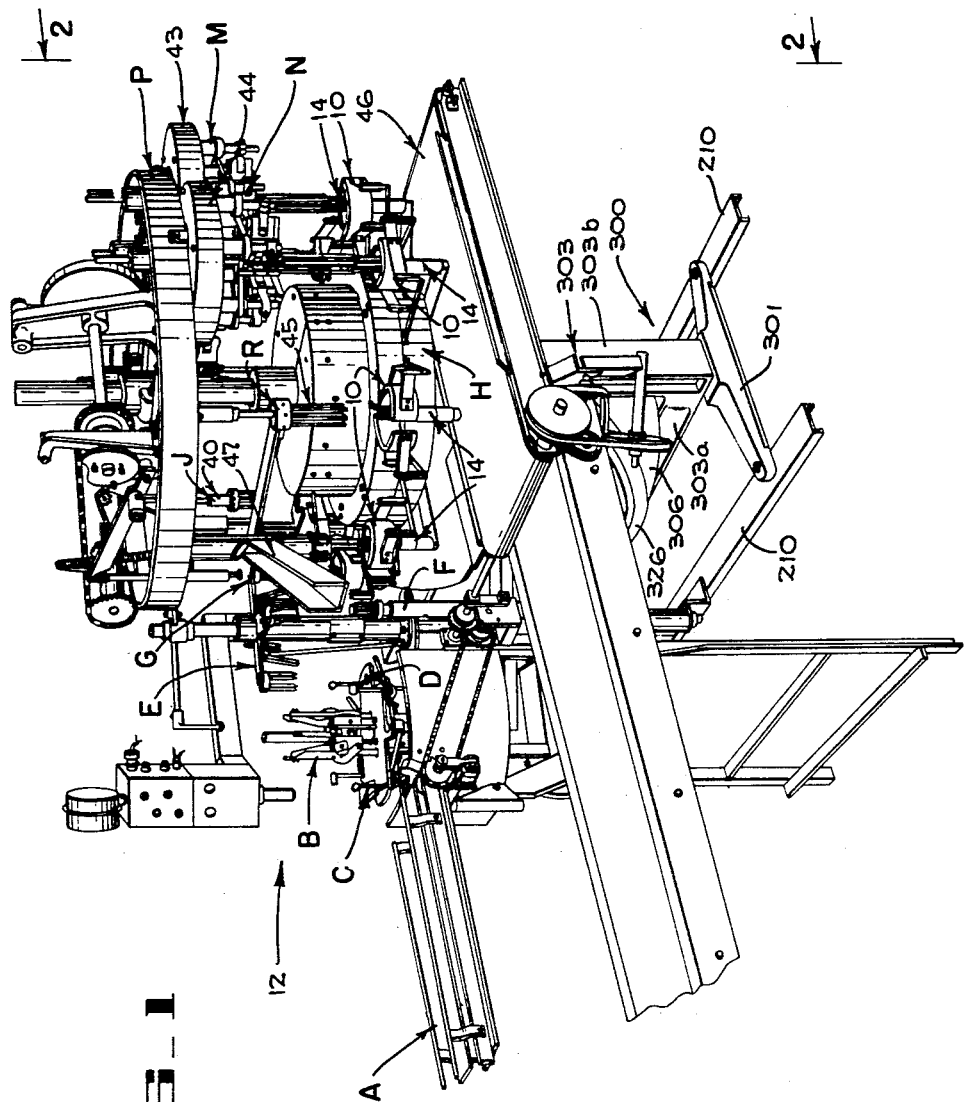
FIG_1
INVENTOR.
HANS W. GROTEWOLD
BY
Hans F. Hoffmeister
ATTORNEY

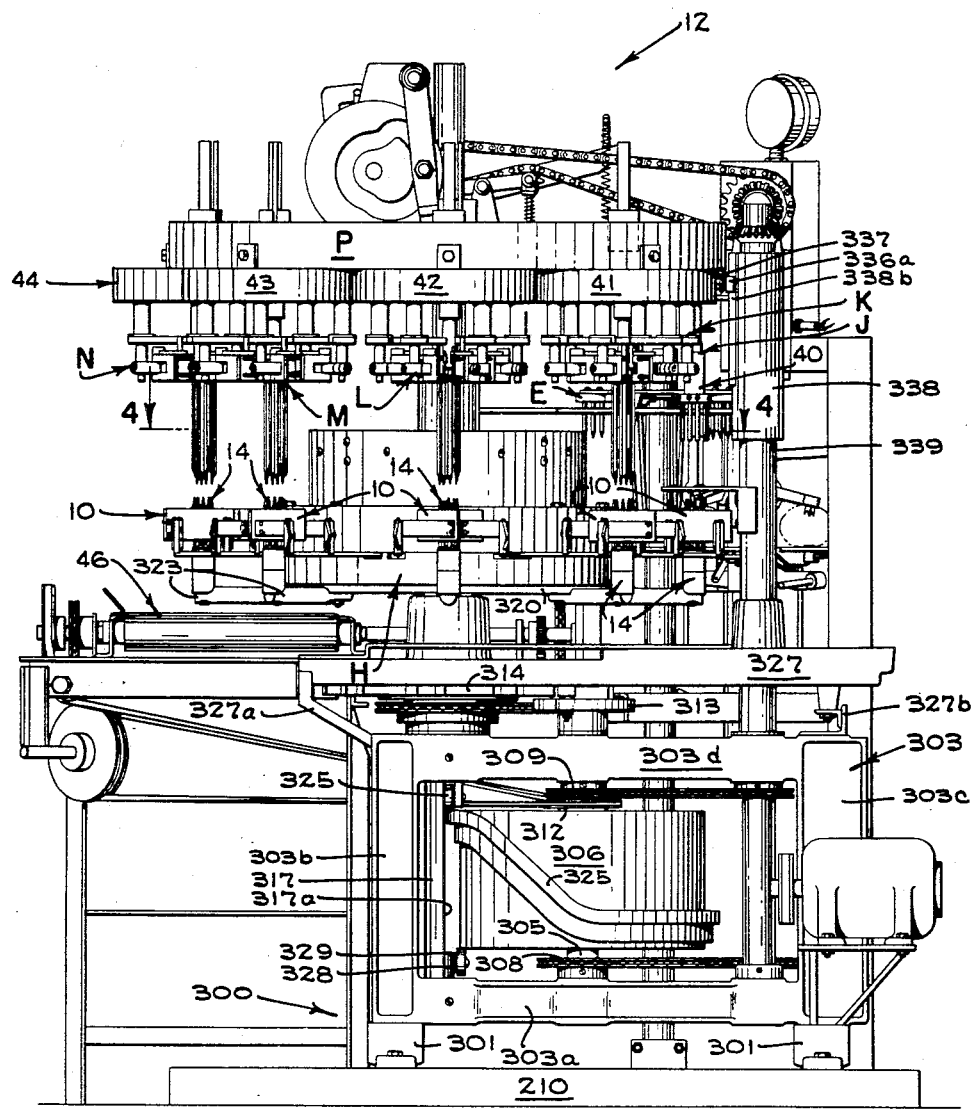

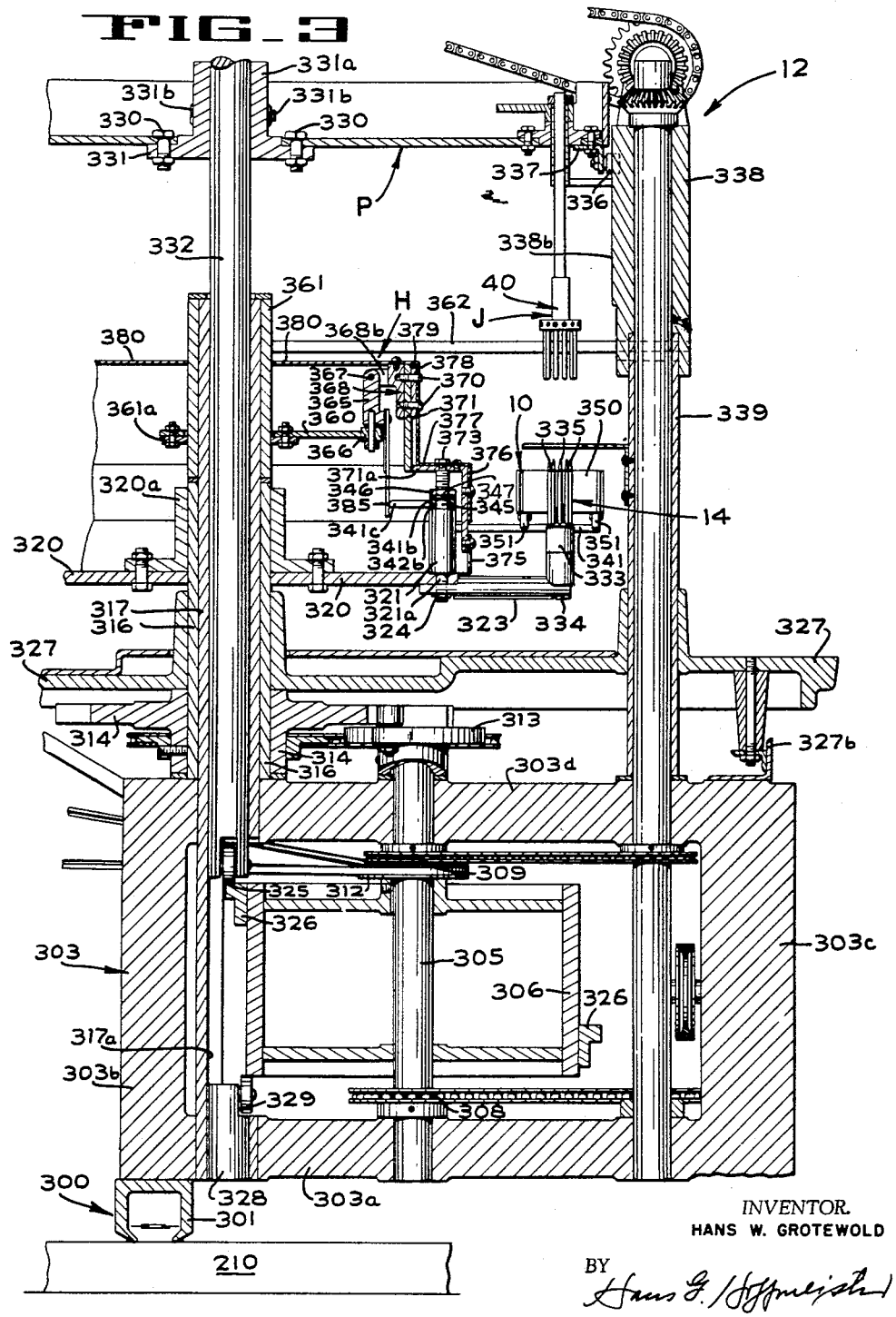

Oct. 6, 1964    H. W. GROTEWOLD    3,151,734
FRUIT CLAMPING MECHANISM
Original Filed April 23, 1958    4 Sheets-Sheet 4
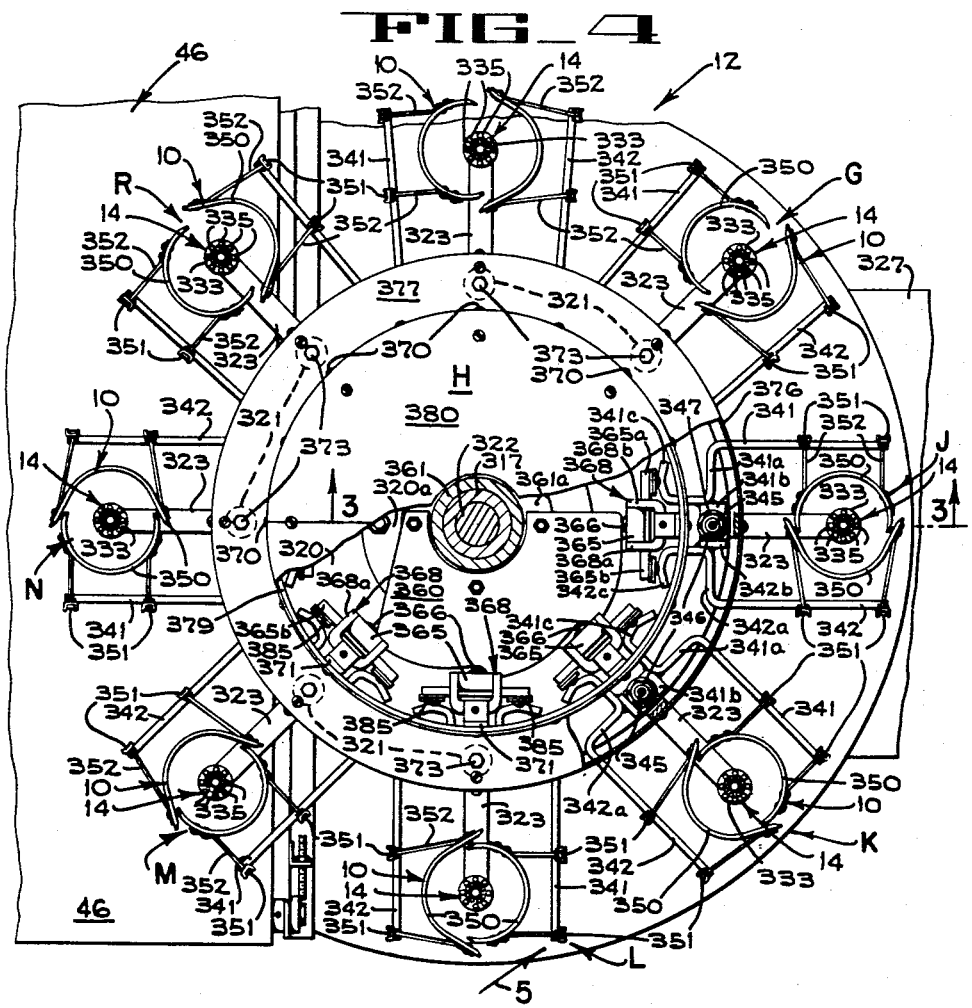
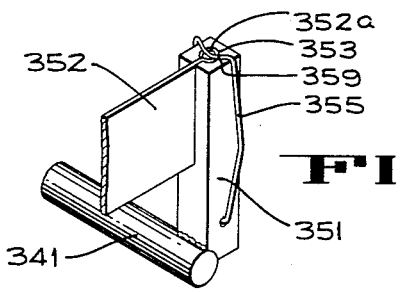
INVENTOR.
HANS W. GROTEWOLD
BY Hans G. Hofmeister
ATTORNEY

3,151,734
FRUIT CLAMPING MECHANISM
Hans W. Grotewold, Sebring, Fla., assignor to FMC Corporation, San Jose, Calif., a corporation of Delaware
Original application Apr. 23, 1958, Ser. No. 730,335. Divided and this application Apr. 16, 1962, Ser. No. 187,609
6 Claims. (Cl. 198—210)

This application is a division of my pending application Ser. No. 730,335 filed April 23, 1958 now Patent No. 3,072,160.

This invention pertains to the processing of fruit, and more particularly relates to a mechanism for holding citrus fruit in compact form as it is processed on a rotary turret of a sectionizing machine.

In the above identified parent application, a citrus fruit sectionizing machine is disclosed wherein each fruit is held in a fruit carrier of a turret while it is processed by tools that move downwardly from above the turret to engage the fruit at various stations. The several tools are positioned so that they engage the fruit at predetermined points in the fruit, the point of penetration of a tool at one station being coordinated with the point of penetration at adjacent stations so that no tool penetrates the fruit at a point previously penetrated by a previous tool and so that each fruit will be engaged at all desirable points of penetration. Accordingly, it is desirable that means be provided for keeping each fruit in fixed position relative to its carrier while it is on the turret even after the various tools have cut into it and disconnected its component parts.

Accordingly, an object of the present invention is to provide an improved fruit clamping mechanism for a citrus fruit sectionizing machine.

Another object is to provide means for holding a fruit in compact form as it is carried through a sectionizing machine.

Another object is to provide improved means for controlling the opening and closing movements of a fruit carrier in timed relation with the indexing movements of an intermittently movable turret.

Another object is to provide means for controlling the opening and closing movements of a fruit carrier in timed relation with the movements of citrus fruit processing tools of a sectionizing machine.

Another object is to provide a fruit clamping mechanism arranged to encompass a grapefruit at a processing station and to be actuated into gentle gripping engagement with the grapefruit as it is advanced between stations.

Another object is to provide an improved rotary conveyor for a sectionizing machine.

These and other objects and advantages will become apparent from the following description and the accompanying drawings, in which:

FIG. 1 is a perspective of a grapefruit sectionizing machine having the fruit clamping mechanism of the present invention associated therewith, certain parts being broken away.

FIG. 2 is an elevation looking in the direction of arrows 2—2 of FIG. 1.

FIG. 3 is a fragmentary vertical section taken substantially along line 3—3 of FIG. 4.

FIG. 4 is an enlarged fragmentary horizontal section taken along lines 4—4 of FIG. 2 with parts broken away.

FIG. 5 is an enlarged perspective taken looking in the direction of arrow 5 in FIG. 4.

The fruit clamping mechanisms 10 (FIG. 1) of the present invention are part of a grapefruit sectionizer 12 which advances peeled and treated grapefruit from a supply conveyor A to a position within reach of an operator, who stands in front of a feed turret B and places each grapefruit on the feed turret at station C of the turret. The feed turret B is intermittently indexed through 90° angular increments in a clockwise direction (FIG. 4) to bring each grapefruit to a transfer station D (FIG. 1) where the grapefruit is automatically transferred from the feed turret B to a transfer turret E which is also arranged to be intermittently indexed in 90° increments in synchronism with the movements of feed turret B, but in a counterclockwise direction. The grapefruit is then moved to a seed disturbing station F and then to a second transfer station G where it is deposited in one of a plurality of fruit carriers 14, each carrier being disposed within one of the fruit clamping mechanisms 10 of the present invention, and mounted on a main turret H (FIG. 1). The main turret H is arranged to be intermittently indexed through 45° angular increments in a clockwise direction to move the grapefruit successively into operative association with a second seed disturber unit 40 (FIG. 2) and with first, second, third and fourth heads 41, 42, 43, and 44, respectively, which are carried by and project downwardly from a vertically movable tool carrier or top plate P. The heads 41, 42, 43 and 44 perform their operations at stations K, L, M and N (FIG. 4), respectively. Each head has a plurality of blades arranged to be moved down into a grapefruit to separate pie-shaped meat segments from the grapefruit core and from the radial membranes. The sectionized grapefruit with the separated segments disposed around the core is then brought under a spinner or stripper unit 45 (FIG. 1) at station R, that wraps the radial membranes around the stationary core, causing any remaining bond between the membranes and the segments to be completely broken and causing the segments to drop onto a discharge conveyor 46. The core is then moved to a position under a core stripping mechanism 47 which moves the core from the fruit carrier.

Since the grapefruit sectionizer 12 has been completely disclosed in the above mentioned parent application, only those parts pertinent to the mechanism of the present invention will be described in detail. If further information is desired concerning the construction and operation of other parts of the grapefruit sectionizer 12, not specifically described herein reference may be had to the parent application.

The main turret H (FIGS. 1 and 2), which supports a plurality of the fruit clamping mechanisms 10, includes a base 300 comprising two spaced base channels 210, two spaced bars 301 which extend between the channels 210 and are bolted thereto, and a vertical frame 303 which is fixed to the bars 301 and projects upwardly therefrom. The frame 303 (FIG. 2) comprises a bottom member 303a, two side members 303b and 303c and a top member 303d. A vertical shaft 305, on which a barrel cam 306 is keyed is journalled for rotation in the bottom and top members 303a and 303d. A drive sprocket 308 is keyed to shaft 305 between the lower end of the barrel cam and the bottom member 303a and a driven sprocket 309 is secured to the shaft 305 between the top of the barrel cam and the top member 303d of the support frame 303. A pulley 312 and a driver 313 of a Geneva drive mechanism are also secured to the shaft 305. The Geneva driver 313 is arranged to periodically engage and rotate a Geneva gear 314 that is keyed to a tubular shaft 316 (FIG. 3) which is rotatably journalled around a guide shaft or tube 317. Near its lower end, the second shaft 317 is fixed, as by setscrews, in both the bottom frame member 303a and the top frame member 303d. A turret plate 320 is provided with a hub 320a clamped around the tubular shaft 316 for rotation therewith. A vertically reciprocable shaft 322, which is slidable in the tubular shaft 317, carries at its lower end a roller 325 which rides along the upper surface of a cam track 326 formed on the periphery of the barrel cam 306. The lower end of the vertical shaft 322 is also slidably journalled on the inner wall of the fixed guide tube 317 which has a cut-away portion 317a into which the cam track 326 projects. A block 328 is secured in the lower portion of tube 317 and carries a roller 329 which is disposed in supporting contact with the lower surface of barrel cam 306. A table 327 is disposed immediately below the turret plate 320, being supported at opposite marginal edges by brackets 327a and 327b secured to the base frame member 303d.

The before-mentioned tool carrier or top plate P is secured by bolts 330 to a circular flange 331 that has a hub 331a clamped to the vertically movable shaft 322 by a bolt 331b. Therefore, when the shaft 322 is reciprocated in a vertical direction, as the roller 325 rides along cam track 326, the top plate P is also reciprocated vertically. The top plate is guided during its vertical reciprocating movement by two spaced rollers 336 and 336a (FIGS. 2 and 3) which are mounted on a bracket 337 secured to the top plate. The rollers ride along oppositely facing vertical flat wall portions formed on an extended portion 338b of a tubular bearing member 338 that is supported from the base frame 303 by a tubular support member 339.

The turret plate 320 (FIGS. 3 and 4) has eight upstanding posts 321 mounted in equally spaced relation around its outer periphery. Directly below each post 321, a support arm 323 extends radially outwardly from the under surface of the plate 320. Each post 321 and its associated support arm 323 are held in fixed position by a nut 324 that is threaded on a stud 321a projecting downwardly from the post through suitable openings in the plate and in the support arm. One of the fruit carrier units 14 is mounted on the outer end of each support arm, said unit comprising an upstanding prong holder 333 which is secured by a capscrew 334 to the outer end of the arm 323. Two concentric circles of prongs 335 (FIG. 4) are fixed in and project upwardly from the prong holder 333.

One of the fruit clamping mechanisms 10 of the present invention is associated with each fruit carrier 14. Each clamping device comprises two clamp-support arms 341 and 342 (FIG. 4) which are disposed on opposite sides of the prongs 335. The arm 341 has a radially inner offset portion 341a carrying an apertured tab 341b that is rotatably journalled on a threaded, reduced diameter projection 345 (FIG. 3) of the associated upstanding post 321. Similarly the arm 342 has an offset portion 342a carrying an apertured tab 342b (FIG. 4) rotatably disposed around the reduced diameter projection 345. A nut 346 is threaded on the projection 345 and is arranged to press a washer 347 against the superposed tabs 341b and 342b. The arms 341 and 342 have inner abutment portions 341c and 342c, respectively (FIG. 4) that are bent to a position generally normal to a line extending radially from the axis of hub 320a.

A generally semi-cylindrical band 350 is mounted on the two spaced posts 351 that project upwardly from the outer clamp-receiving end portion of each of the arms 341 and 342. Each band 350 is made of yieldable material, such as rubber, and has a spring steel strap 352 riveted to each end. Each of the straps 352 (FIG. 5) has a curled inner end 352a which is slipped into a keyhole slot 353 extending downwardly in the associated post 351. A spring clip 355 is pivotally mounted at its lower end in each post 351 and has a pointed intermediate portion 359 arranged to extend into the top portion of the keyhole slot to resiliently retain the spring clip 355 in place.

The clamp arms 341 and 342 are urged toward each other to enclose and grip a fruit disposed therebetween. cam plate 360 (FIGS. 3 and 4) which is secured to a flange 361a that is welded on a tube 361. The tube 361 is disposed around the fixed shaft 317 and is held against rotation by a flat bar 362 that is secured to a flange 338a of the tubular bearing member 338. The cam plate 360 is arranged to engage a follower roller 366 (FIG. 3) carried on the lower end of a lever 365. At its upper end the lever 365 is pivotally mounted on a pin 367 between two arms 368a and 368b (FIG. 4) of a bracket 368 that is secured by capscrews 370 (FIG. 3) to the upper end of a fixed mounting member 371. The mounting member 371 is held in fixed position by means of a capscrew 373 which passes through an opening in a horizontal portion 371a of the member 371 and is threaded in the upper end of the reduced diameter projection 345 of post 321. It will be evident that, since there are eight posts 321 there will be eight fixed mounting members 371 spaced around the periphery of the turret. These eight mounting members provide support for annular dust shields 375, 376, 377, 378, a rigid band 379, and a cover plate 380, all of said members being connected to the fixed mounting members by capscrews or the like.

The cam-actuated lever 365 has two laterally projecting arms 365a and 365b (FIG. 4) adjacent its lower end. Each of these arms carries a downwardly projecting leaf spring 385 which is disposed opposite one of the bent inner arms 341c or 342c of the clamp arms 341 and 342.

In the operation of the fruit clamping mechanism 10 (FIG. 4), each follower roller 366 comes into contact with the outer peripheral camming edge of the cam plate 360 just after the associated fruit carrier 14 has completed its movement from transfer station G to the second seed disturber station, indicated by reference letter J. The camming surface is so designed that the fruit clamping members 10 are moved toward a position around the grapefruit in the fruit carrier but are not urged into gripping engagement with the grapefruit at this seed disturber station. However, when the next indexing movement of the turret begins, the cam immediately pivots lever 365 causing the clamping bands to grip the grapefruit. When the fruit reaches station K under the first head 41 (FIG. 2), the roller follower 366 (FIG. 13) moves into a recess in the camming surface, causing the clamping bands to relax their grip on the grapefruit while the first head cuts into the grapefruit. When the fruit carrier 14 is moved to station L under the second head 42, the bands are moved to gripping engagement with the grapefruit and then relaxed when station L is reached. Similarly, the bands are tightened around the grapefruit during movement from station L to M, and released at station M under the third head 43. Since the clamping bands are relaxed during the operation of the heads, they will yield and move outwardly when contacted by the blades of the sectionizing heads as the blades move radially outwardly through the grapefruit. The light clamping pressure on the grapefruit as it is moved from station to station keeps the grapefruit in a compact form and in a predetermined orientation and prevents shifting of the grapefruit sections. As explained in the parent application, at station M under the third sectionizing head the blades of the head are not moved all the way out through the grapefruit. Accordingly, the bands will not be spread by the blades and, no inward movement of the bands is necessary between stations M and N. At station N the blades move the bands to an outer spread position. Since there is no further need for keeping the grapefruit in compact form, the clamping bands are not moved inwardly again until the seed disturber station J is again reached by the fruit carrier.

From the foregoing description, it is apparent that the fruit clamping mechanism of the present invention is arranged to lightly clamp the grapefruit segments together as the grapefruit is moved between processing stations to maintain the grapefruit in compact form and to prevent shifting of the grapefruit sections. When the grapefruit is disposed at the processing stations, the gripping pressure is relieved so that the grapefruit segments may be moved radially outward but be held from discharge from the carrier by the resilient nature of certain parts of the clamping mechanism.

Having thus described by invention, what I claim as new and desire to protect by Letters Patent is:

1. In a fruit processing machine, a fruit clamping device comprising a fixed post, a pair of clamp support arms pivoted on said post, each arm having a clamp-receiving portion on one side of said post and an abutment portion on the other side of the post, an arcuate band resiliently supported on the clamp-receiving portion of each arm and cooperating with the arcuate band of the other arm to define a generally cylindrical enclosure, lever means mounted adjacent said post and including a flat spring actuator engaged with the abutment portion of each clamp support arm, and means for pivoting said lever means in a direction to cause said flat springs to apply pressure to said clamp support arms and swing said bands toward each other to enclose and grip a fruit disposed therebetween.

2. In a fruit processing machine, a fruit clamping device comprising a fixed post a pair of clamp support arms pivotally mounted on said post, each arm having a clamp-receiving portion disposed in spaced confronting relation to a similar portion on the other arm and having an abutment portion disposed on the opposite side of said post from said clamp-receiving portion, a pair of resilient members projecting inwardly from each clamp-receiving portion toward the opposed clamp-receiving portion, an arcuate band secured to the inner ends of each pair of resilient members, the two opposed bands cooperating to form a generally cylindrical enclosure, and means for simultaneously engaging said abutment portions of said arms to pivot said arms about said post and urge said bands into clamping engagement around a fruit disposed therebetween.

3. In a fruit processing machine, a fruit clamping device comprising a pair of pivotally mounted arms having end portions disposed in laterally spaced relation, a pair of posts secured to and projecting upwardly from each of said arm end portions, each post having a vertically extending cylindrical opening, a spring member projecting inwardly from each post of each arm toward a post on the other arm, each spring member having a curled end portion disposed in one of said cylindrical openings, and an arcuate clamp member of yieldable material secured to the inner ends of the two spring members carried by the two posts of each arm, said arcuate clamp members having confronting concave surfaces cooperating to define a fruit enclosure.

4. In a fruit processing machine, a fruit clamping device comprising: a first pivotally mounted clamp support arm having an end portion; a second pivotally mounted clamp support arm having an end portion, said support arm end portions being spaced apart and being movable toward and away from one another by pivotal movement of said support arms; a first pair of spaced resilient spring arms, each arm having one end affixed to said end portion of the first support arm and extending toward the second support arm and terminating in a free end spaced from said first support arm; a second pair of spaced resilient spring arms, each arm having one end fixed to said end portion of the second support arm and extending toward the first support arm and terminating in a free end spaced from said second support arm; a first yieldable arcuate band of flexible material extending between and secured at its ends to the free ends of the first pair of spring arms; and a second yieldable arcuate band of flexible material extending between and secured at its ends to the free ends of the second pair of spring arms, the bands being arranged so that their concave surfaces confront one another and so that, when the end portions of said clamp support arms are moved toward one another, the bands define a fruit enclosure.

5. In a fruit processing machine, a fruit clamping device comprising: a first pivotally mounted clam support means; a second pivotally mounted clamp support means spaced from said first support means, said clamp support means being movable toward and away from one another; a pair of spaced cylindrical openings formed in each clamp support means; a pair of spaced resilient spring arms projecting inwardly from each clamp support means toward the other clamp support means, each spring arm having a curled end portion disposed in one of said cylindrical openings; and a yieldable arcuate fruit contacing band secured at its ends to the inner ends of the spring arms of each pair of spring arms, said bands having confronting concave surfaces cooperating to define a fruit enclosure.

6. In a fruit process machine: a turret; means for rotating said turret; a plurality of fruit support members disposed on said turret in spaced relation around the periphery thereof; a pair of clamp support arm associated with each fruit support member and pivotally mounted on and extending radially from said turret, the arms of each pair being arranged on either side of the associated fruit support member for movement toward and away from said support member; a pair of resilient spring arms secured to each arm of each pair of clamp arms and extending toward the other arm of that pair, the spring arms of each pair being spaced apart so that their free ends are arranged on either side of the associated fruit support member; a yieldable arcuate band of flexible material extending between and having its ends secured to the free ends of each pair of spring arms so that the two bands thereby associated with each fruit support member have their cavities confronting one another so as to define a fruit enclosure about said fruit support member; cam means mounted in fixed position adjacent said turret; a resilient flexible operating lever for each pair of clamp support arms, said lever being carried by said turret and being operatively connected to said pair of clamp support arms; and cam follower means operatively connected to each lever and arranged to be engaged by said cam means during rotation of said turret, said cam means having a plurality of spaced camming surfaces arranged to engage said follower means and apply pressure thereto tending to pivot and flex said lever and to move the associated pair of clamp support arms toward each other and toward the associated fruit support member to substantially disclose and clamp a fruit between the flexible bands associated therewith, and said cam means having a recessed portion between said camming surfaces effective to relieve the pressure applied by said camming surfaces.

References Cited in the file of this patent
UNITED STATES PATENTS
2,429,346     Dunn _____ Oct. 21, 1947